May 5, 1970　　AKIRA NISHIYAMA　　3,510,767
SAMPLING OSCILLOSCOPE FOR NONREPEATED INPUT
SIGNALS INCLUDING A LOOPED CIRCUIT
Filed Sept. 27, 1965　　　　　　　　　　　　2 Sheets-Sheet 1
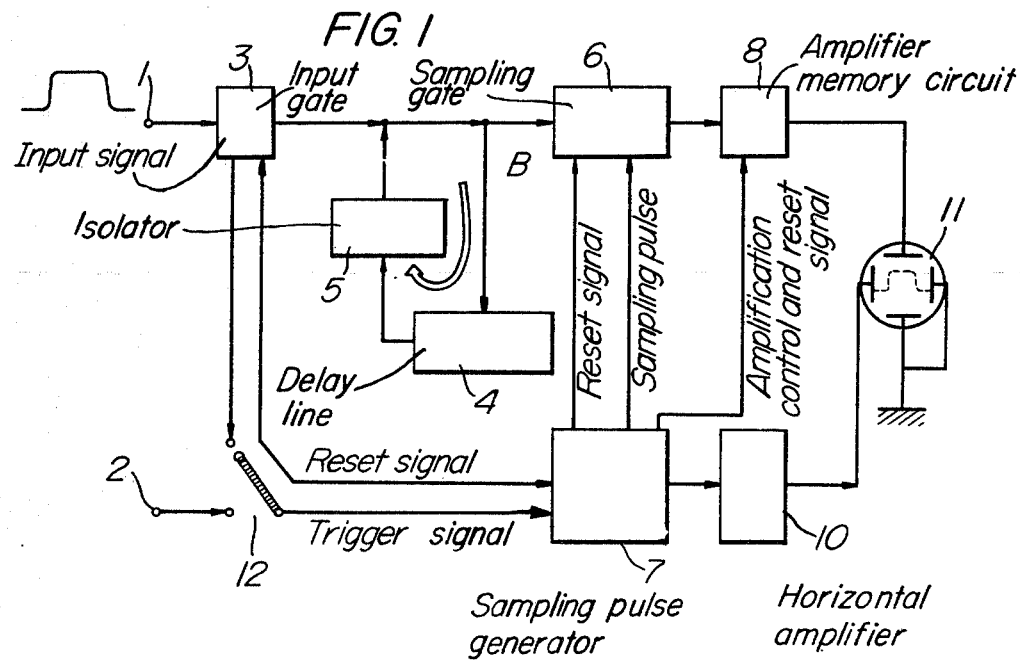
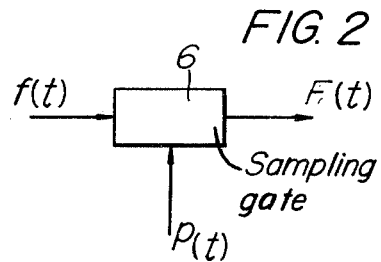
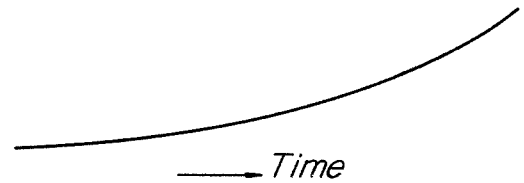
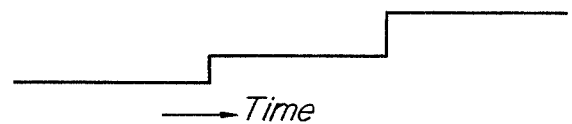
INVENTOR
Akira Nishiyama
BY Stevens, Davis, Miller & Mosher
ATTORNEYS Stepwise-biased sampling pulse INVENTOR
Akira Nishiyama
BY Stevens, Davis, Miller & Mosher
ATTORNEYS United States Patent Office 3,510,767
Patented May 5, 1970

3,510,767
SAMPLING OSCILLOSCOPE FOR NONREPEATED INPUT SIGNALS INCLUDING A LOOPED CIRCUIT
Akira Nishiyama, Neyagawa-shi, Japan, assignor to Matsushita Electric Industrial Co., Ltd., Osaka, Japan, a corporation of Japan
Filed Sept. 27, 1965, Ser. No. 490,200
Claims priority, application Japan, Sept. 29, 1964, 39/55,597, 39/55,602; Feb. 19, 1965, 40/9,636
Int. Cl. G01r 13/20, 23/16; H03k 5/00
U.S. Cl. 324—77
19 Claims

ABSTRACT OF THE DISCLOSURE

A sampling oscilloscope adapted for observing an extremely rapid and nonrepetitive phenomena in which a plurality of samplings are possible and also for a non-repetitive one-shot signal waveform by making an input signal circulate in a signal recurring looped circuit which includes a delay line.

---

This invention relates to sampling oscilloscopes for nonrepeated input, that is, for observation of extremely rapid and nonrepeated phenomena.

With conventional oscilloscopes, if used to display the waveform of electric signals including frequency components of several hundred megacycles or higher directly, the frequency bandwidth of the amplifier circuit is heavily limited due to the stray capacitances involved. This limitation can be avoided by applying the signal directly to the cathode-ray tube but at the same time the sensitivity of the oscilloscope is reduced to an extreme extent.

In contrast, so-called sampling oscilloscopes exhibit a very high sensitivity even to signals having superhigh frequency components and thus are capable of showing the waveform of such signals on the screen of the cathode-ray tube as long as the signal is repetitive. The technique of the sampling oscilloscope has been introduced by S. Hansen and D. E. Norgaard (e.g. see U.S. Pats. 2,280,524 and 2,280,531).

In general, the sampling oscilloscope has a sampling gate to which is applied the signal waveform under examination. On the other hand, sampling pulses, which rise extremely sharply, are applied to the gate to control the gate. Upon arrival of a sampling pulse, the gate is opened to allow the input signal to pass through and to reach an amplifier memory circuit, the output of which acts to vertically deflect the electron beam in the cathode-ray tube.

With ordinary sampling oscilloscopes, sampling is done once for a single input pulse waveform and the sampling time is delayed little by little for successively arriving repetitive signal pulses. Thus, the gate is opened at progressively delayed times for the successive pulses so that different portions of the input waveform are sampled in succession to be applied across the vertical deflector plates of the cathode-ray tube.

The sampling instants, when the sampling is effected, are determined by detecting the time points at which a saw-tooth and a staircase voltage have the same voltage value. The saw-tooth and staircase voltages starting at the same time exhibit the same voltage value at a definite time point and the voltage coincidence is utilized to produce a sampling pulse. Subsequently, when the next following input signal or waveform arrives, the staircase voltage has a value a step higher, with which the saw-tooth voltage again coincides at a time point slightly delayed with respect to the input signal compared to the preceding sampling time point. In this manner, the waveform of the signal input is repeatedly sampled at successively delayed time points and the sampling output is amplified and applied across the vertical-deflection plates of the cathode-ray tube.

Thus, with ordinary sampling oscilloscopes, it will be apparent that, in order to obtain an input waveform, i.e., to plot such waveform on the screen of the cathode-ray tube, it is necessary to apply a multitude of inputs having quite the same waveform successively to the sampling gate. This forms a serious defect of the ordinary sampling oscilloscope, with which it is impossible to observe any nonrepeated signal waveform.

An alternative method in which no sampling is used but the input signal is fed to the cathode-ray tube with or without amplification is advantageous in that it makes it possible even to observe one-shot signals, i.e. the signals which occur only once. However, with this method, any satisfactory sensitivity such as described hereinbefore cannot be obtained in the frequency band more than several hundred megacycles.

Accordingly, it is a primary object of the present invention to provide a sampling oscilloscope which is particularly designed for measurement of one-shot input signals and is satisfactorily sensitive.

Other objects of the present invention will become apparent from the following detailed description, reference being had to the accompanying drawings, showing one preferred embodiment, chosen by way of example, of the present invention.

FIG. 1 is a block diagram illustrating a sampling oscilloscope of the present invention;

FIG. 2 is a diagram explaining the operation of the sampling gate;

FIGS. 3a and 3b illustrate time variation of the degree of amplification of the amplifier memory circuit;

Figure 4:
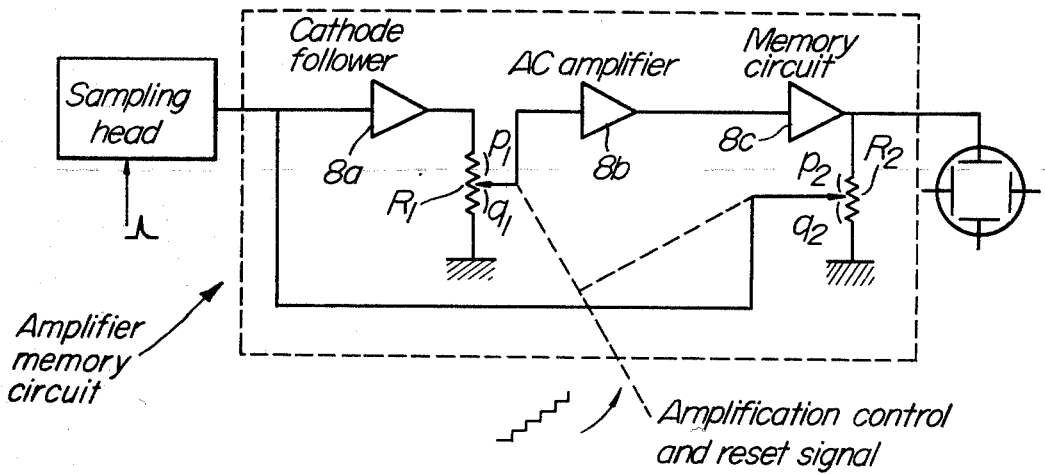
FIG. 4 illustrates one form of amplifier memory circuit.
Figure 5:
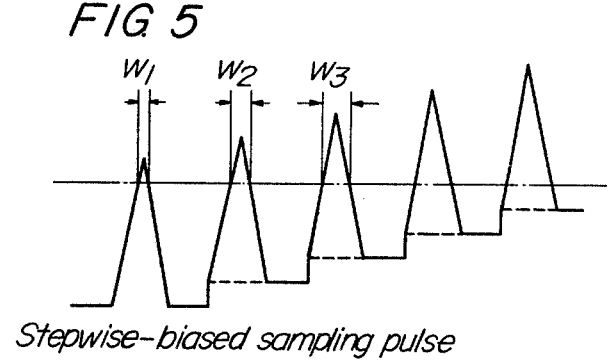
FIG. 5 illustrates one example of sampling-pulse train waveform.

Referring first to FIG. 1, a one-shot input signal to be examined or observed is applied to the terminal 1 of input gate 3 while a trigger signal synchronized with the input signal is applied to trigger input terminal 2. The input gate 3 closes immediately after the passage therethrough of the signal to be examined to intercept any disturbing input which may follow. Also, a trigger signal for internal synchronization may be drawn out of the input gate 3. Whether a trigger signal is taken from input gate 3 or from trigger input terminal 2 is determined by the position of a trigger signal changeover switch 12.

The input signal having passed through the input gate 3 first proceeds to the input end B of a sampling gate 6, which is fed with a sampling pulse from a sampling pulse generator 7 to sample the input signal.

The input signal arriving at point 8 to be sampled also proceeds through a delay loop formed of a delay line 4 and an isolator 5 to return to point B. Accordingly, the sampling pulse generator 7 generates another sampling pulse so that the input signal is again sampled at an instant spaced from the first sampling instant by the time required for the signal to travel through the delay loop plus a certain time increment $\Delta T$. In this manner, it will be appreciated that once the input signal starts to circulate through the delay loop, it is sampled at point B repeatedly a predetermined number of times as required to plot the signal waveform.

The output of the sampling gate 6 is applied through an amplifier memory circuit 8 across the vertical-deflection plates of a cathode-ray tube 11 so that the amplitudes or voltage levels of the input signal at respective sampling instants are plotted on the screen of the cathode-ray tube to display thereon the waveform of the input signal.

The electron beam in the cathode-ray tube is deflected horizontally in synchronism with the above-described sampling process, as will be described below.

A staircase voltage is separated from the sampling pulse generator 7 for cooperation with a saw-tooth voltage to determine the sampling instants. The staircase voltage is amplified by a horizontal amplifier 10 and applied across the horizontal-deflection plates of the cathode-ray tube so that the horizontal position of the point of electron bombardment on the phosphor screen is progressively shifted each time the signal is sampled thereby to give a complete display of the signal waveform. When the signal sampling has been effected the required number of times, a reset signal is fed from the sampling pulse generator 7 to extinguish the input signal recurring through the delay loop, including delay line 4 and isolator 5, and at the same time to open the input gate ready to receive the next input signal.

Incidentally, the isolator 5 is employed to serve the purpose of preventing the input signal from initially plunging into the delay loop and proceed therethrough in an opposite direction causing distortion of the signal waveform.

Having described the basic arrangement and operation of the sampling oscilloscope according to the present invention, description will next be made of various means employed therein to obtain a satisfactory oscilloscopic performance.

As already described, according to the present invention, the input signal passing through the input gate 3 arrives at point B to be sampled and thereafter recurrently proceeds through the delay loop, including delay line 4 and isolator 5, to be sampled again each time it returns to point B. During this process, any distortion of the signal waveform due to sampling can be avoided by incorporating a high input impedance in the sampling gate 6 but attenuation of the signal within the delay loop is unavoidable. Thus, the signal waveform is attenuated each time its recurrence through the delay loop is repeated with the result that the waveform displayed on the cathode-ray tube by successively sampling such signal being progressively attenuated is inevitably distorted to differ from the original waveform of the input signal. This difficulty may be overcome by inserting an amplifier in the delay loop directly to compensate for the attenuation. Such remedy, however, is not readily feasible on account of the frequency range and bandwidth involved.

To eliminate the distortion of the signal waveform, the present invention proposes to vary the amplitude or width of the sampling pulses, which are fed from the sampling pulse generator 7 into the sampling gate 6, in accordance with the number of times the input signal has recurred through the delay loop so that the signal attenuation caused within the recurrent system may be compensated for consecutively at each sampling instant.

Referring to FIG. 2, the input signal $f(t)$ is sampled by way of the sampling gate 6 under control of the sampling pulse $p(t)$. The output $F(t)$ of the sampling gate 6 depends upon not only the input signal $f(t)$ but also the waveform of the sampling pulse $p(t)$. Accordingly, the decrement or amount of attenuation of the input signal due to its recurrence through the delay loop can be compensated for by continuously or stepwise increasing the amplitude or width of sampling pulse $p(t)$ for successive signal samplings.

In this case, it is to be noted that the amplitude or width of the sampling pulse is started to increase at the instant when the sampling begins and is restored to the original value simultaneously with the resetting of the signal recurring through the delay loop when the sampling has been repeated a sufficient number of times to completely plot the signal waveform on the cathode-ray tube. The sampling pulses may be fed in various waveforms. For example, in case a triangular waveform is employed, any increase with time in pulse amplitude is accompanied by a corresponding increase in pulse width or duration.

In addition to the above methods, the signal attenuation in the delay loop may also be compensated for by the following method.

As indicated in FIG. 1, an amplification control signal is sent from the sampling pulse generator 7 to the amplifier memory circuit 8 to control the latter so that its gain of amplification is varied with time. This control is started when the recurrence of the input signal through the delay loop 4–5 is started so that the gain of the amplifier memory circuit 8 is raised continuously as shown in FIG. 3A or stepwise as shown in FIG. 3B and, in either case, in an exponential fashion. The degree of amplification of the amplifier member circuit 8 can be varied in different ways, for example, by varying the bias voltage applied to the circuit or any of various parameters thereof or by varying the amount of feedback of the feedback circuit. In any case, such controlling should be effected, within an appropriate range not to make the amplifier memory circuit 8 unstable.

Where the signal attenuation in the looped circuit or delay loop 4–5 is compensated for by varying the degree of amplification of the amplifier memory circuit 8 as described above, it will be appreciated that the signal waveform can be depicted on the phosphor screen of the cathode-ray tube without distortion.

At the end of the sampling process, when a reset signal is fed from the sampling pulse generator 7 to the input gate 3 and sampling gate 6, an amplification reset signal is simultaneously issued from the sampling pulse generator to restore the degree of amplification of the amplifier memory circuit 8 to its original level.

Description will next be made on the structure of the different parts of the present oscilloscope shown in the block diagram of FIG. 1.

First, the delay line 4 may take the form of a coaxial cable or a solid-state delay circuit. In either case, the longer the period of sampling cycle, generally the longer delay time is required and the greater signal attenuation in the delay circuit results. To avoid this difficulty, it may be recommendable to employ, for example, a coaxial cable operable at extreme low temperatures. For example, a coaxial cable exhibiting a 1 $\mu$sec. delay time can readily be obtained which only involves a loss of the order of 1 db at 1 gc. The attenuation is reduced with rise of the sampling rate and with improvement of the cable used. With the above example of coaxial cable, the signal is attenuated by 1 db upon each its recurrence through the delay loop, including the delay circuit 4 and isolator 5, and such attenuation can be compensated for, for example, by increasing the gain of the amplifier memory circuit 8 by 1 db each time of successive samplings.

To this end, the amplifier memory circuit 8 is constituted, as shown in FIG. 4, of a cathode follower 8a, an AC amplifier 8b and a memory circuit 8c with two potentiometers $R_1$ and $R_2$ arranged for gain control and adjustment of the amount of feedback, respectively. The two potentiometers may be changed over mechanically, but preferably are changed over electronically to obtain a satisfactory responding speed. Let $p_1$ and $q_1$ represent the respective resistance values of the upper and lower portions of one of the potentiometers $R_1$ and, for example, suppose that the resistance $p_1$ takes the form of a transistor or diode, the impedance of which varies with a bias voltage, applied thereto. To serve as an amplification control signal, the bias voltage should have a staircase waveform which rises stepwise for successive samplings. Resistance $q_1$, may be fixed or take the form of an impedance variable reversely to the resistance $p_1$. Also, in order to obtain a fixed loop gain, it is desirable that the other potentiometer $R_2$ takes an inverse voltage-division ratio corresponding to the variation of the first potentiometer $R_1$, the voltage-division ratios of the two potentiometers being fixed as far as possible. By doing this, it will be understood that an improved response can be obtained between the sampling points.

For compensating the signal attenuation by the way of sampling pulses, which are generally of a triangular waveform, both the amplitude and effective pulse width W can be varied by raising or lowering the bias voltage being applied to the sampling pulses of the triangular waveform. In this case, any excessive increase in pulse width might deteriorate the frequency response of the sampling oscilloscope, therefore the range of the adjustment of the pulse width is limited by the frequency response required. If the signal attenuation is compensated for by controlling the gain of the amplifier memory circuit, in addition to varying the width of sampling pulses or the range of adjustment is enlarged and the signal attenuation is satisfactorily compensated for, enabling the signal waveform to be displayed with no substantial distortion.

Control signals of the staircase waveform usable for compensation of the signal attenuation can all be formed upon the basis of the staircase waveform employed to determine the sampling instants.

Figure 6:
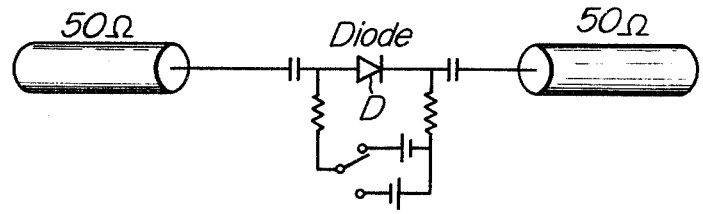
FIG. 6 is a circuit diagram illustrating one form of input gate.

The input gate 3 is usually joined at its inlet and outlet with a 50Ω cable and upon entrance of an input signal is closed to intercept any noises which may follow. An example of the gate circuit includes, as shown in FIG. 6, a diode switch including a diode D, which is made conductive or nonconductive by changing the polarity of the bias voltage being applied thereto.

Next, the isolator 5 is provided to prevent the signal from entering the delay loop 4–5 in an opposite direction, as described hereinbefore, and may take a circuit form including a diode gate employed as an input gate 3. It is to be noted that such diode gate is opened only when it first receives the input signal and is closed during recurrence of the signal through the delay loop. The same isolation effect can also be obtained by use of a common-load amplifier circuit including either a two-input one-output type pulse transformer or two transistors or diodes, both free of any mutual interference.

According to the present invention, it will be appreciated from the foregoing, a novel sampling oscilloscope for nonrepeated input can be provided with which not only any input waveforms in the frequency range including superhigh frequency bands can be observed with high sensitivity but any nonrepeated or one-shot phenomena, observation of which has been impossible with any conventional sampling oscilloscopes, can be readily observed.

Particularly, according to the present invention, the signal attenuation in the looped delay circuit is effectively compensated for to enable accurate signal observation without any substantial waveform distortion. Also, because of the effective compensation of the signal attenuation, the recurrence of the input signal through the looped circuit may be continued to repeat the cycle of signal sampling any desired number of times to enable observation of the signal waveform with high accuracy.

What is claimed is:

1. A sampling oscilloscope adapted for observation of nonrepeated phenomena comprising: sampling circuit means having an input and an output; a horizontal sweeping signal generator; a cathode ray tube having vertical-deflection plates connected to the output of the sampling circuit means and horizontal-deflection plates connected to an output of said horizontal sweeping signal generator; a looped circuit connected at the input of said sampling circuit means for receiving an input signal, feeding the signal therethrough and applying the same signal repeatedly to said sampling circuit means, said looped circuit including a delay means to give a small time delay to the circulating signal for each successive passage therethrough.

2. A sampling oscilloscope as claimed in claim 1 wherein said looped circuit further comprises an isolator for preventing the input signal from entering to the loop circuit in a reverse direction.

3. A sampling oscilloscope as claimed in claim 1 wherein said sampling circuit means comprises means to selectively increase the width and amplitude of sampling pulses to be applied to a sampling gate of said sampling circuit means successively so as to eliminate distortion of the sampled output due to attenuation of the signal recurring through the looped circuit.

4. A sampling oscilloscope as claimed in claim 1 wherein said sampling circuit means comprises a sampling gate, a sampling pulse generator and an amplifier memory circuit for amplifying the output fed from said sampling circuit means and means for increasing the gain of said amplifier memory circuit so as to eliminate distortion of the output of said sampling circuit means due to attenuation of the signal recurring through the looped circuit.

5. A sampling oscilloscope as claimed in claim 4 in which said gain is increased in an exponential fashion.

6. A sampling oscilloscope as claimed in claim 4 in which an amplification control signal is fed from the sampling pulse generator to the amplifier memory circuit to increase the degree of amplification thereof.

7. A sampling oscilloscope as claimed in claim 1 wherein said sampling circuit means comprises an amplifier memory circuit for amplifying the output fed from said sampling circuit means and means for selectively increasing the width and amplitude of the sampling pulses to be applied to a sampling gate of said sampling circuit means successively while at the same time increasing the gain of the amplifier memory circuit so as to eliminate distortion of the output of said sampling circuit means due to attenuation of the signal recurring through the looped circuit.

8. A sampling oscilloscope as claimed in claim 7 in which said gain is increased in an exponential fashion.

9. A sampling oscilloscope as claimed in claim 7 in which an amplification control signal is fed from a sampling pulse generator of the sampling circuit means to the amplifier memory circuit to increase the gain thereof.

10. A sampling oscilloscope as claimed in claim 7 wherein said looped circuit further comprises an isolator for preventing the input signal from entering into the looped circuit in a reverse direction.

11. A sampling oscilloscope as claimed in claim 7 further comprising an input circuit including an input gate so operable after completion of passage of an input signal therethrough as to close to thereby preclude any disturbing signal which may follow the input signal, and said sampling circuit means further comprising means for extinguishing the signal recurring through the looped circuit while at the same time re-opening the input gate for reception of the next input signal when the signal sampling has been repeated in the sampling circuit means in response to each sampling pulse a number of times required to present the signal waveform on a cathode-ray tube.

12. A sampling oscilloscope as claimed in claim 11 wherein said looped circuit further comprises an isolator for preventing the input signal from entering to the looped circuit in a reverse direction.

13. A sampling oscilloscope as claimed in claim 1 further comprising an input circuit connected before said looped circuit to transmit the input signal to said looped circuit, said input circuit including an input gate so operable after completion of passage of an input signal therethrough as to close to thereby preclude any disturbing signal which may follow the input signal.

14. A sampling oscilloscope as claimed in claim 13 wherein said sampling circuit means comprises means for extinguishing the signal recurring through the looped circuit and at the same time re-opening the input gate ready for reception of the next signal input when the signal sampling has been repeated in the sampling circuit in response to each sampling pulse a number of times required to present the signal waveform on a cathode-ray tube.

15. A sampling oscilloscope as claimed in claim 14 wherein said sampling circuit means further comprises an amplifier memory circuit for amplifying the output fed from said sampling circuit means, and means for increasing the gain of the amplifier memory circuit so as to eliminate distortion of the sampled output due to the attenuation of the signal recurring through the loop.

16. A sampling oscilloscope as claimed in claim 14 wherein said sampling circuit means further comprises means for selectively increasing the amplitude and width of the sampling pulses to be applied to a sampling gate of said sampling circuit means successively.

17. A sampling oscilloscope as claimed in claim 16, wherein said looped circuit further comprises an isolator for preventing the input signal from entering to the looped circuit in a reverse direction.

18. A sampling oscilloscope as claimed in claim 14 wherein said looped circuit further comprises an isolator for preventing the input signal from entering the looped circuit in a reverse direction.

19. A sampling oscilloscope as claimed in claim 18, wherein said sampling circuit means further comprises an amplifier memory circuit for amplifying the output fed from said sampling circuit and means for increasing the gain of the sampled output due to attenuation of the signal recurring through the looped circuit.

References Cited

UNITED STATES PATENTS

| | | |
|---|---|---|
| 3,263,169 | 7/1966 | Remley. |
| 3,337,800 | 8/1967 | Halley et al. |
| 3,011,129 | 11/1961 | Magleby et al. _____ 328—151 |
| 3,021,478 | 2/1962 | Meacham. |
| 3,124,746 | 3/1964 | Strathman _____ 324—103 X |

FOREIGN PATENTS

| | | |
|---|---|---|
| 1,002,476 | 8/1965 | Great Britain. |
| 1,355,241 | 2/1964 | France. |

EDWARD E. KUBASIEWICZ, Primary Examiner

U.S. Cl. X.R.

315—22; 324—121; 328—151